United States Patent
Zeng et al.

(10) Patent No.: US 8,018,314 B2
(45) Date of Patent: Sep. 13, 2011

(54) CENTER-TAPPED TRANSFORMER

(75) Inventors: Zhong Zeng, Taipei (TW); Xuezheng Ding, Taipei (TW); Limin Du, Taipei (TW); Xin Guo, Taipei (TW); Zhihong Ye, Taipei (TW)

(73) Assignees: Silitek Electronic (Guangzhou) Co., Ltd., Guangzhou (CN); Lite-On Technology Corp., Taipei (TW)

( * ) Notice: Subject to any disclaimer, the term of this patent is extended or adjusted under 35 U.S.C. 154(b) by 0 days.

(21) Appl. No.: 12/788,855

(22) Filed: May 27, 2010

(65) Prior Publication Data

US 2010/0231343 A1  Sep. 16, 2010

Related U.S. Application Data

(63) Continuation-in-part of application No. 12/232,476, filed on Sep. 18, 2008, now abandoned.

(51) Int. Cl.
*H01F 27/30* (2006.01)
(52) U.S. Cl. .......................... 336/208; 336/198; 336/192
(58) Field of Classification Search .................. None
See application file for complete search history.

(56) References Cited

U.S. PATENT DOCUMENTS

| | | | | |
|---|---|---|---|---|
| 3,652,968 | A | * | 3/1972 | Johnston et al. ............... 336/170 |
| 4,857,878 | A | * | 8/1989 | Eng et al. ....................... 336/192 |
| 5,534,839 | A | * | 7/1996 | Mackin et al. ................. 336/192 |
| 5,670,925 | A | * | 9/1997 | Gibbs ............................. 336/208 |
| 5,673,013 | A | * | 9/1997 | Moody et al. .................. 336/192 |
| 5,996,214 | A | * | 12/1999 | Bell ................................ 29/605 |
| 7,271,694 | B2 | * | 9/2007 | Chang ............................ 336/208 |

* cited by examiner

*Primary Examiner* — Anh T Mai
(74) *Attorney, Agent, or Firm* — Rosenberg, Klein & Lee

(57) ABSTRACT

A center-tapped transformer includes tubular first and second spools, a primary winding unit, and first and second secondary winding units. The first spool has a first surrounding wall, a first pin-mounting wall, and a first pin set mounted on the first pin-mounting wall. The second spool has a second surrounding wall, a second pin-mounting wall, and a second pin set mounted on the second pin-mounting wall. The second surrounding wall has an inner diameter larger than an outer diameter of the first surrounding wall. The primary winding unit is wound on one of the first and second surrounding walls. The first and second secondary winding units are wound on the other one of the first and second surrounding walls.

9 Claims, 10 Drawing Sheets

CENTER-TAPPED TRANSFORMER

CROSS-REFERENCE TO RELATED APPLICATION

This is a continuation-in-part (CIP) of U.S. patent application Ser. No. 12/232,476, filed on Sep. 18, 2008.

BACKGROUND OF THE INVENTION

1. Field of the Invention

The invention relates to a transformer, more particularly to a center-tapped transformer.

2. Description of the Related Art

Most electronic apparatus include a transformer as a core component to satisfy power transformation requirements. A transformer has an inherent leakage inductance. In particular, some magnetic lines of force generated when electricity is supplied to a primary winding do not pass through a secondary winding and thus do not generate corresponding electric current in the secondary winding. The leakage inductance is a measure of inductance of such magnetic lines of force (also called leakage flux).

In general, the leakage inductance of a transformer should be kept as small as possible. However, in some applications, the transformer is required to have a certain level of leakage inductance, such as when the leakage inductance is employed as a resonance inductance, or when the leakage inductance of a common-mode inductor is employed as a differential-mode inductance, etc.

FIG. 1 is a sectional diagram of a conventional center-tapped transformer 100, which includes a tubular spool 102, a primary winding 104, a first secondary winding 106, a second secondary winding 108, a first isolating unit 110, a second isolating unit 112, and an iron core (not shown). The spool 102 is formed with a hollow portion 114 for extension of the iron core therethrough. The primary winding 104 is wound on the spool 102. The first secondary winding 106 is wound around the primary winding 104 and is spaced apart therefrom by the ring-shaped first isolating unit 110. The second secondary winding 108 is wound around the first secondary winding 106 and is spaced apart therefrom by the ring-shaped second isolating unit 112.

FIG. 2a is a schematic diagram of an asymmetric half-bridge LLC circuit including the transformer 100, wherein ($L_m$) is the excitation inductance of the transformer 100 and ($L_1$) is the leakage inductance of the primary winding 104. When a sinusoidal current ($I_i$) (such as the waveform 101 in FIG. 2d) is inputted into the transformer 100 at a node 15 of the circuit, the circuit will output a rectified current ($I_o$) (such as the waveform 103 in FIG. 2d). FIGS. 2b and 2c show two different working states of the asymmetric half-bridge LLC circuit, respectively. During a positive half-cycle of the waveform of the input current ($I_i$), a diode ($D_1$) conducts, a diode ($D_2$) is cutoff, and the primary winding induces a leakage inductance ($L_{s1}$). On the other hand, during a negative half-cycle of the waveform of the input current ($I_i$), the diode ($D_2$) conducts, the diode ($D_1$) is cutoff, and the primary winding induces a leakage inductance ($L_{s2}$). In theory, the values of the leakage inductances ($L_{s1}$) and ($L_{s2}$) should be close to each other in order for the circuit to work more efficiently and to reduce power loss.

Since the leakage inductance ($L_1$) of the primary winding 104 of the transformer 100 will vary with the change in the input current ($I_i$), there is a relatively large difference between the values of the leakage inductances ($L_{s1}$) and ($L_{s2}$), which in turn results in non-uniform amplitude of the output current ($I_o$), as evident from the waveform 103 in FIG. 2d. Due to the high and low peak values of the output current ($I_o$), the circuit experiences larger power loss, thereby restricting applications of the transformer 100 and circuits employing the same.

FIG. 3 is a sectional diagram of another conventional center-tapped transformer 200, which includes a tubular spool 202, a primary winding 204, a first secondary winding 206, a second secondary winding 208, a first isolating unit 212, a second isolating unit 210, and an iron core (not shown). The spool 202 is formed with a hollow portion 214 for extension of the iron core therethrough. The primary winding 204 is wound on an upper section of the spool 202. The first secondary winding 206 is wound on a lower section of the spool 202 and is spaced apart from the primary winding 204 by the ring-shaped first isolating unit 212. The second secondary winding 208 is wound around the first secondary winding 206 and is spaced apart therefrom by the ring-shaped second isolating unit 210.

Compared to the transformer 100 of FIG. 1, the leakage inductance of the primary winding 204 of the transformer 200 is maintained at a certain level for different circuit working states, and the insulation distance between the primary winding 204 and the first and second secondary winding units 206, 208 has a positive effect on safety specifications. Nevertheless, the leakage inductance of the transformer 200 and circuits employing the same is relatively large, which restricts applications of the same.

It is apparent from the foregoing that the conventional center-tapped transformers 100, 200 either have non-uniform leakage inductance or a rather large leakage inductance, which results in large circuit power loss and restricts applications of the same.

SUMMARY OF THE INVENTION

Therefore, the object of the present invention is to provide a center-tapped transformer that can overcome at least one of the abovementioned drawbacks of the prior art.

Accordingly, a center-tapped transformer of this invention comprises:

a tubular first spool having
   a first surrounding wall defining a spool axis, and having opposite first and second ends,
   a first pin-mounting wall extending radially and outwardly from a portion of the first end of the first surrounding wall, and
   a first pin set mounted on the first pin-mounting wall;
a tubular second spool having
   a second surrounding wall,
   a second pin-mounting wall extending radially and outwardly from a portion of one end of the second surrounding wall, and
   a second pin set mounted on the second pin-mounting wall;
   the second surrounding wall having an inner diameter larger than an outer diameter of the first surrounding wall, and permitting the second end of the first surrounding wall to be inserted into the second surrounding wall;
a primary winding unit wound on one of the first and second surrounding walls; and
first and second secondary winding units wound on the other one of the first and second surrounding walls.

BRIEF DESCRIPTION OF THE DRAWINGS

Other features and advantages of the present invention will become apparent in the following detailed description of the preferred embodiments with reference to the accompanying drawings, of which:

FIGS. 2b and 2c show two different working states of the asymmetric half-bridge LLC circuit of FIG. 2a;

FIG. 2d illustrates input and output current waveforms in the asymmetric half-bridge LLC circuit of FIG. 2a;

DETAILED DESCRIPTION OF THE PREFERRED EMBODIMENTS

Figure 4A:
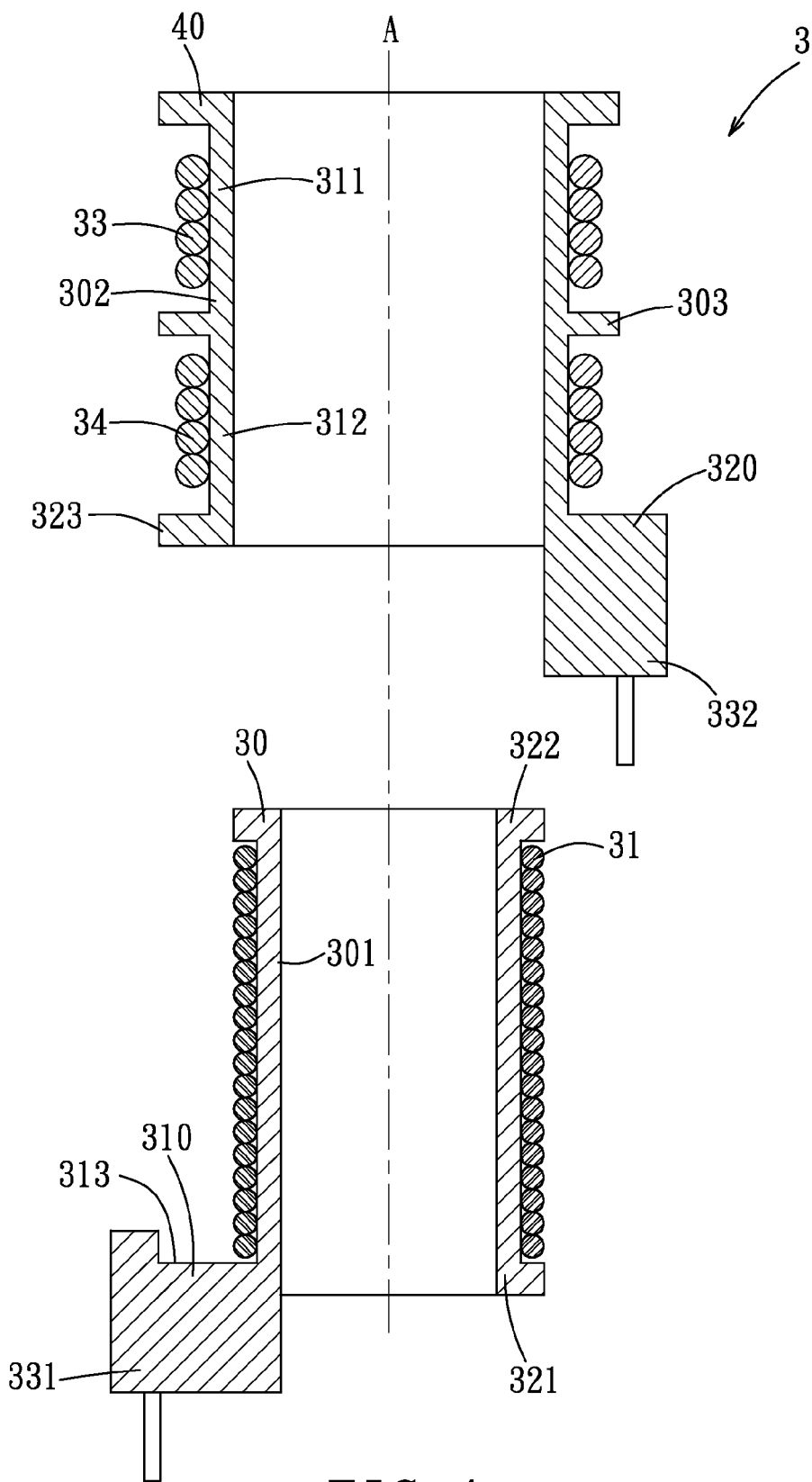
FIG. 4a is a partly exploded sectional diagram of the first preferred embodiment of a center-tapped transformer according to the present invention.
Figure 4B:
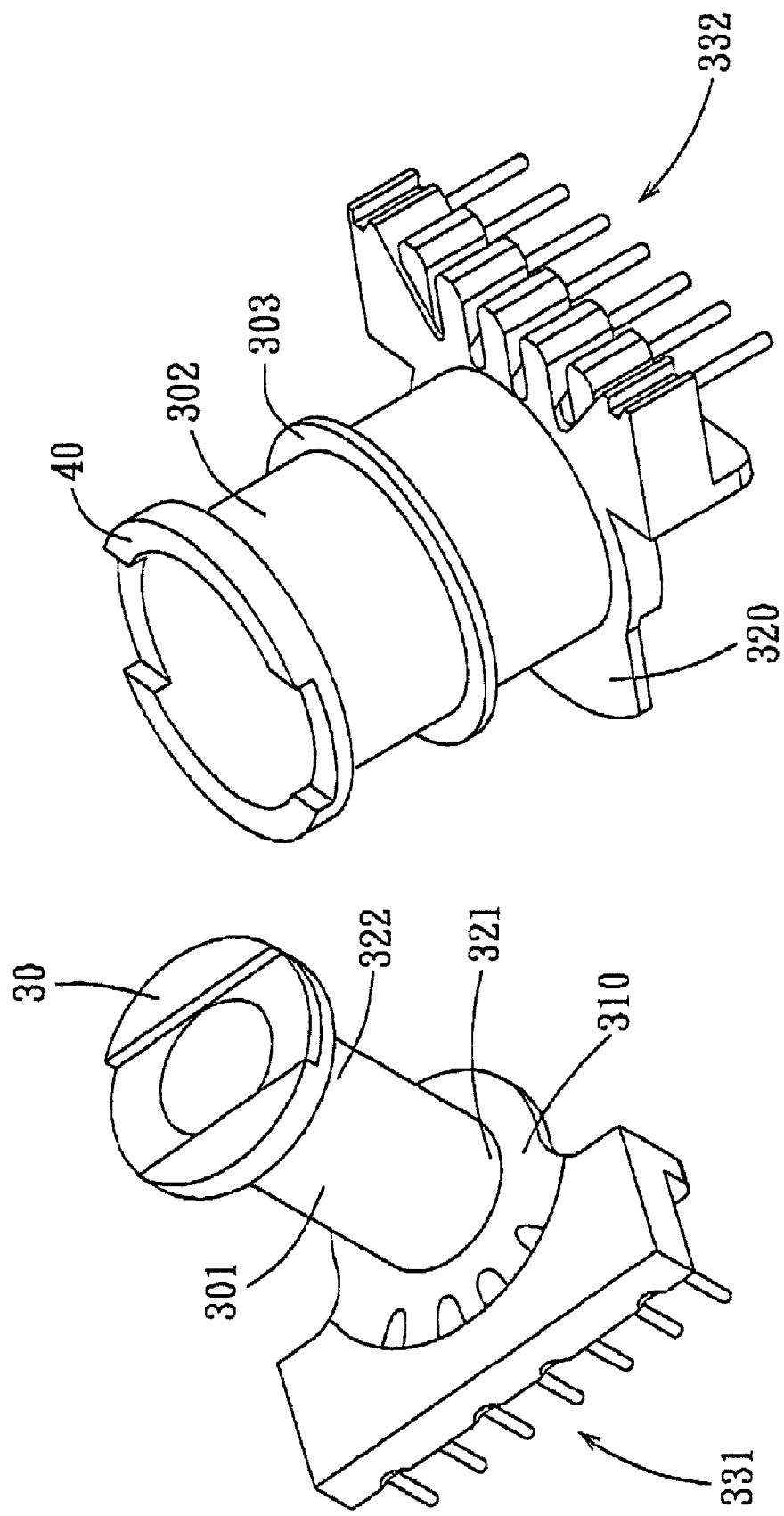
FIG. 4b is an exploded perspective view showing first and second spools of the first preferred embodiment.

Referring to FIGS. 4a and 4b, the first preferred embodiment of a center-tapped transformer 3 according to the present invention is shown to include a tubular first spool 30, a primary winding unit 31, a first secondary winding unit 33, a second secondary winding unit 34, a tubular second spool 40, and an iron core (not shown).

The first spool 30 has a first surrounding wall 301, a first pin-mounting wall 310, and a first pin set 331. The first surrounding wall 301 defines a spool axis (A), and has opposite first and second ends 321, 322. The first pin-mounting wall 310 extends radially and outwardly from a portion of the first end 321 of the first surrounding wall 301 and is formed with a recess 313. The first pin set 331 is mounted on the first pin-mounting wall 310 opposite to the recess 313 along the spool axis (A).

The second spool 40 has a second surrounding wall 302, a second pin-mounting wall 320, and a second pin set 332. The second pin-mounting wall 320 extends radially and outwardly from a portion of an end of the second surrounding wall 302. The second pin set 332 is mounted on the second pin-mounting wall 320. The second surrounding wall 302 is formed with a flange 323 extending radially and outwardly from another portion of the first end of the second surrounding wall 302 that is diametrically opposite to the second pin mounting wall 320. The second spool 40 further has a partition plate 303 that extends in radial outward directions from the second surrounding wall 302 so as to divide the second spool 40 into axially extending first and second spool parts 311, 312. The partition plate 303 is formed integrally with the second surrounding wall 302 in this embodiment. The primary winding unit 31 is wound on the first surrounding wall 301 and is connected electrically to the first pin set 331. The first and second secondary winding units 33, 34 are disposed side-by-side along the spool axis (A), are wound on the first and second spool parts 311, 312, respectively, and are connected electrically to the second pin set 332.

The second surrounding wall 302 of the second spool 40 has an inner diameter larger than an outer diameter of the first surrounding wall 301 of the first spool 30, and permits the second end 322 of the first surrounding wall 301 to be inserted into the second surrounding wall 302. Further referring to FIG. 4e, the first and second pin sets 331, 332 are disposed at diametrically opposite sides of the spool axis (A), and the flange 323 engages the recess 313 so as to retain the first surrounding wall 301 in the second surrounding wall 302 when the first surrounding wall 301 is inserted into the second surrounding wall 302.

The iron core is to be extended into the surrounding wall 301 of the first spool 30, and can be any one of the following: EE type iron core, EC type iron core, EF type iron core, ER type iron core, PQ type iron core, EER type iron core, EFD type iron core, ERL type iron core and PM type iron core. Since the feature of this invention does not reside in the iron core, further details of the same are omitted herein for the sake of brevity.

In this embodiment, the first and second spools 30, 40 include the vertical spool axis (A). However, it should be noted that the first and second spools may have a horizontal spool axis in other embodiments.

Figure 1:
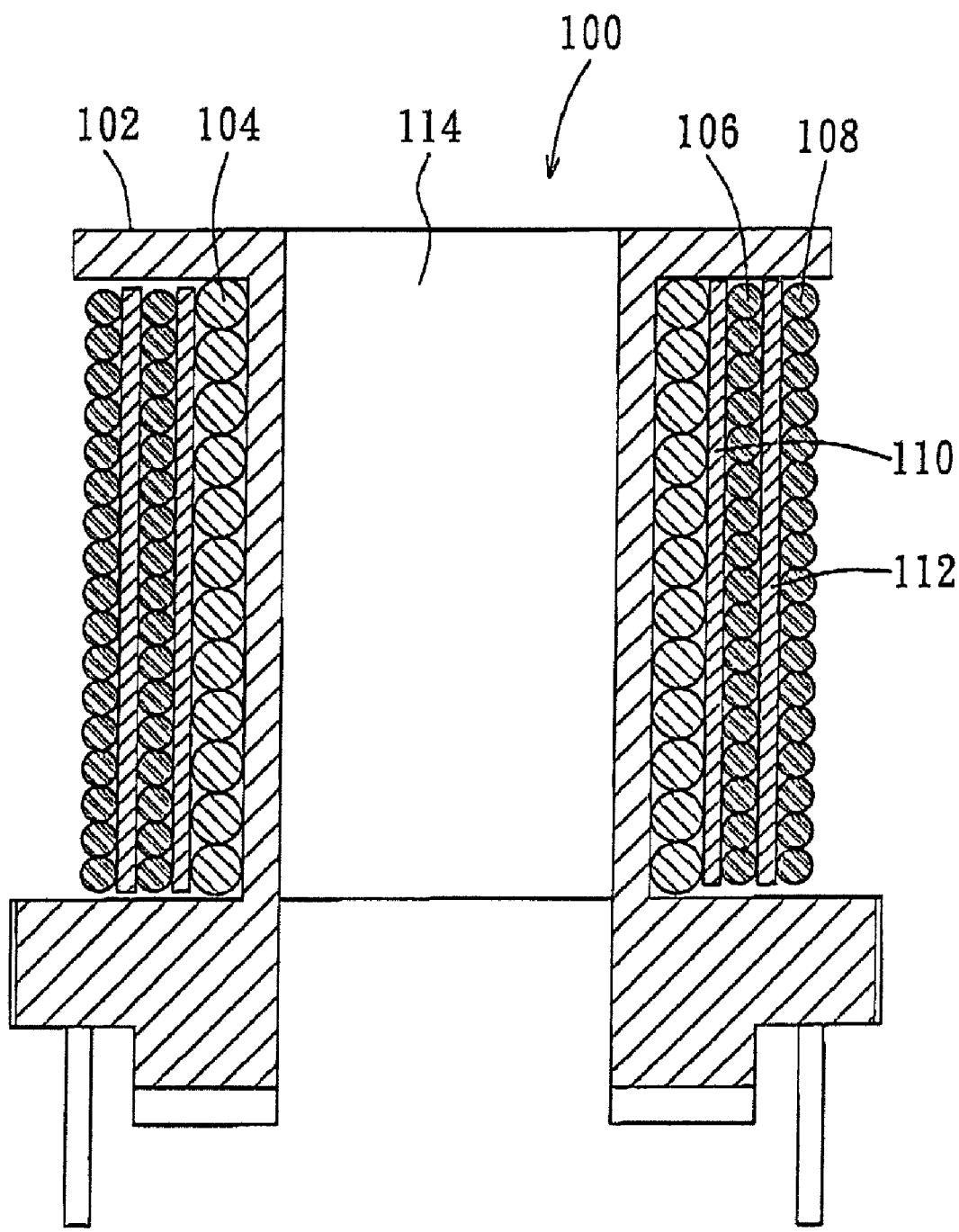
FIG. 1 is a sectional diagram of a conventional center-tapped transformer.
Figure 2A:
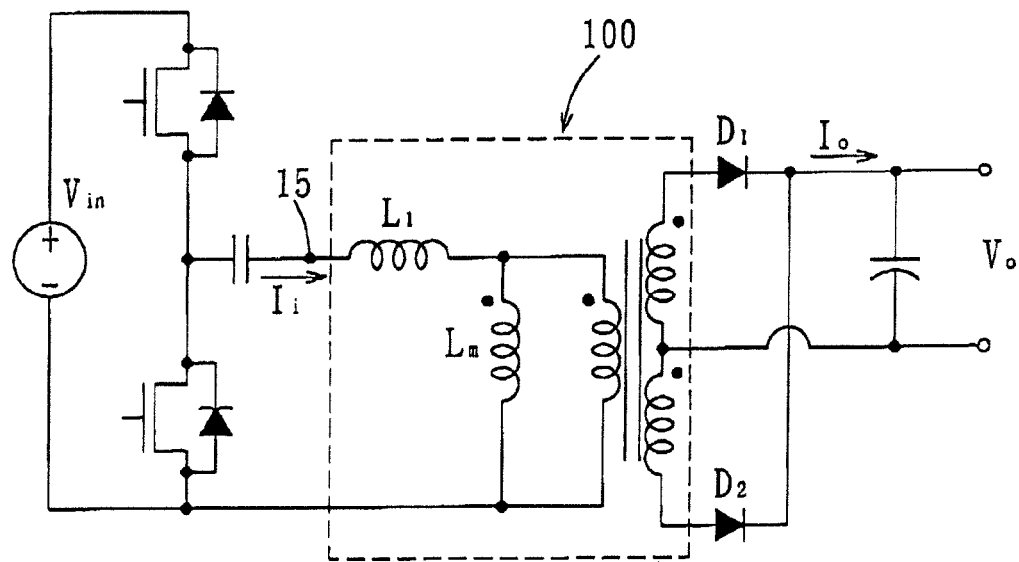
FIG. 2a is a circuit diagram of an asymmetric half-bridge LLC circuit including the transformer of FIG. 1.
Figure 2B:
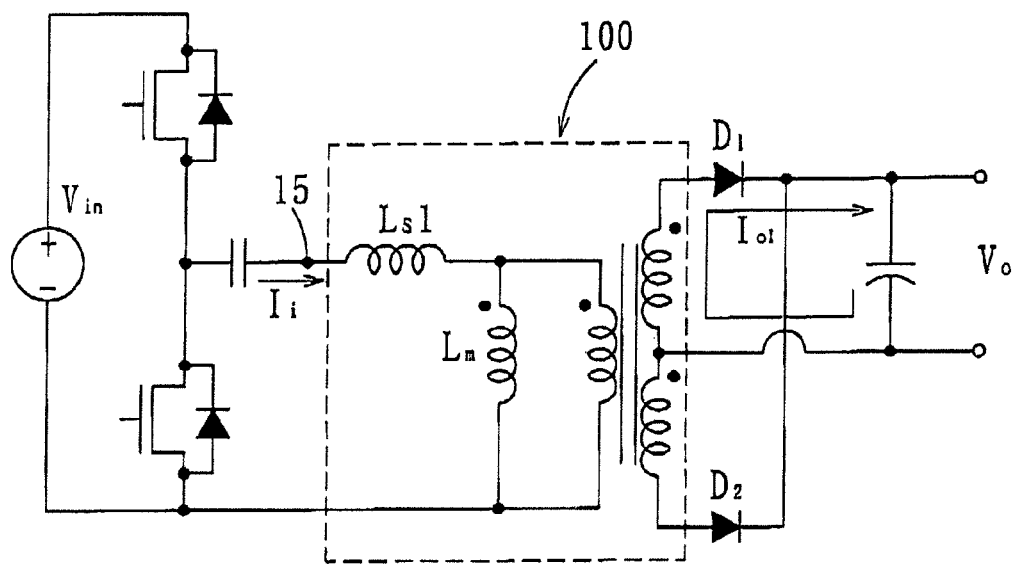
Figure 2C:
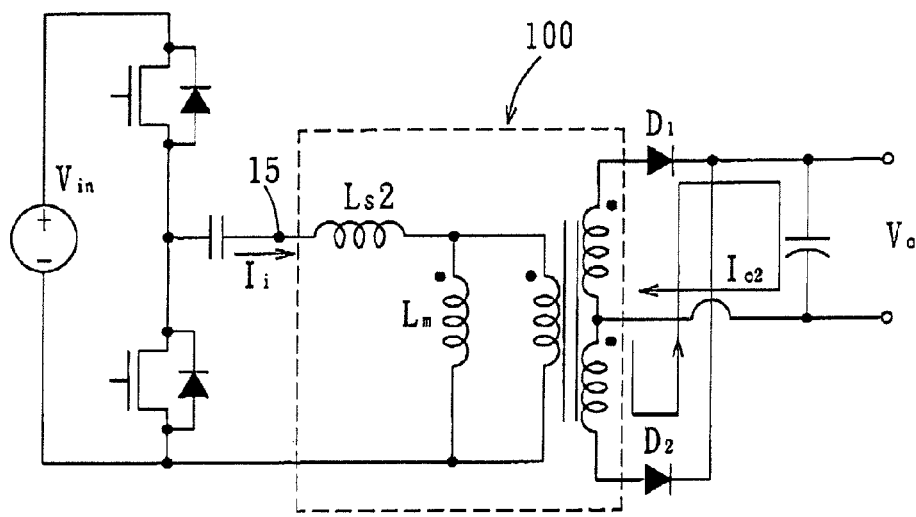
Figure 2D:
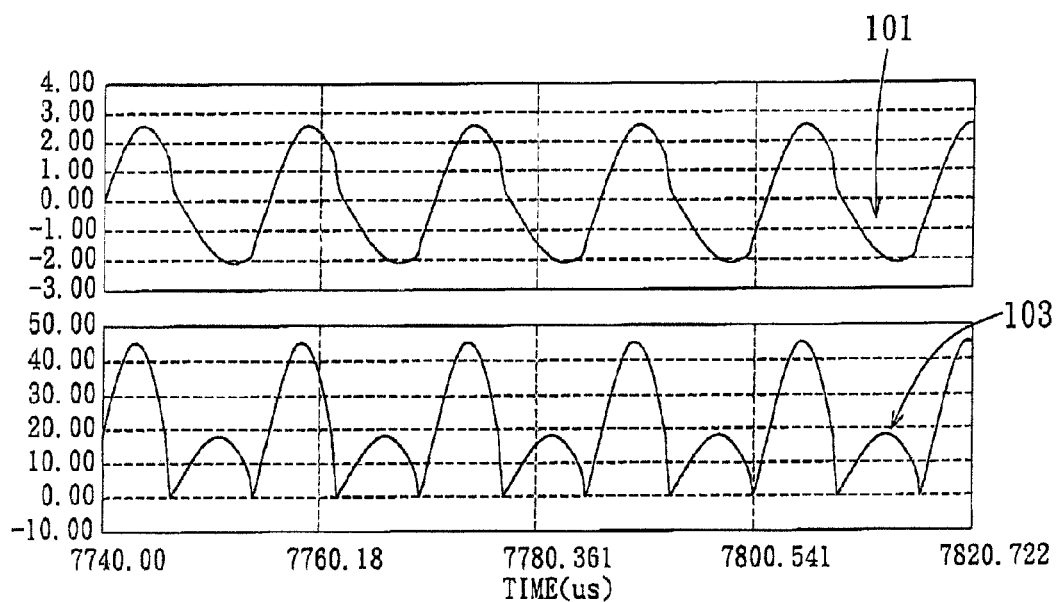
Figure 3:
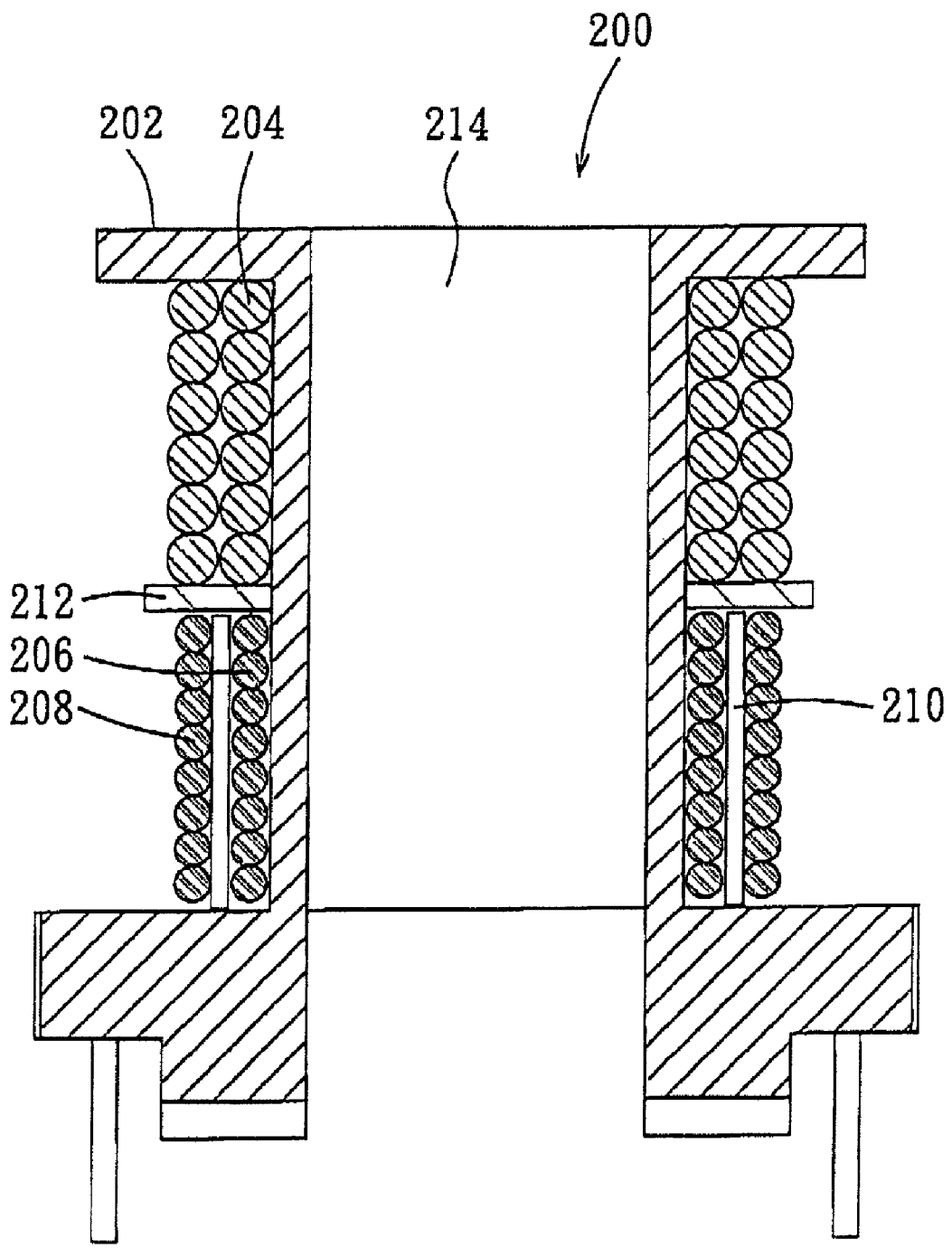
FIG. 3 is a sectional diagram of another conventional center-tapped transformer.
Figure 4C:
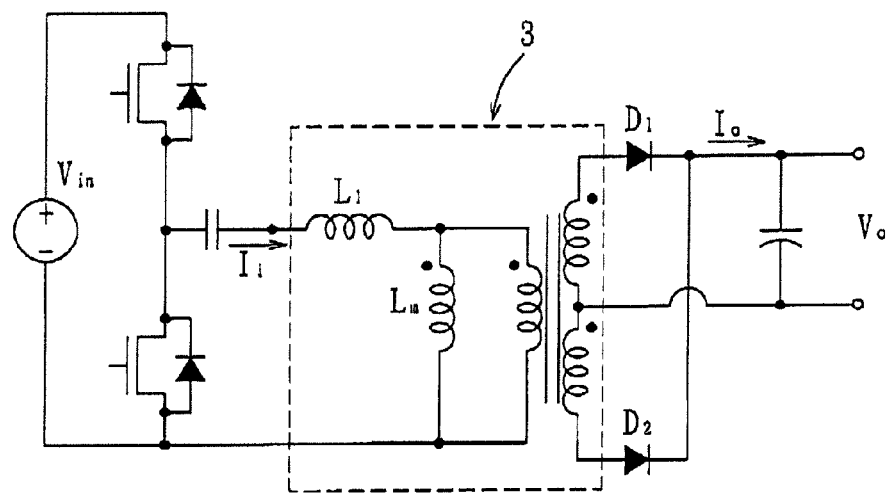
FIG. 4c is a circuit diagram of an asymmetric half-bridge LLC circuit including the first preferred embodiment.
Figure 4D:
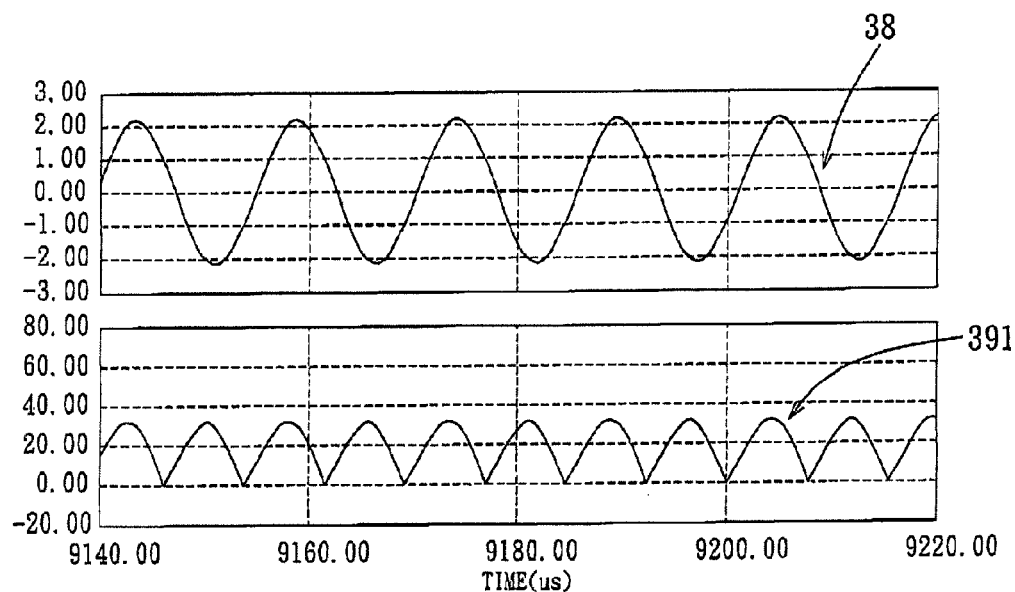
FIG. 4d illustrates input and output current waveforms in the asymmetric half-bridge LLC circuit of FIG. 4c.
Figure 4E:
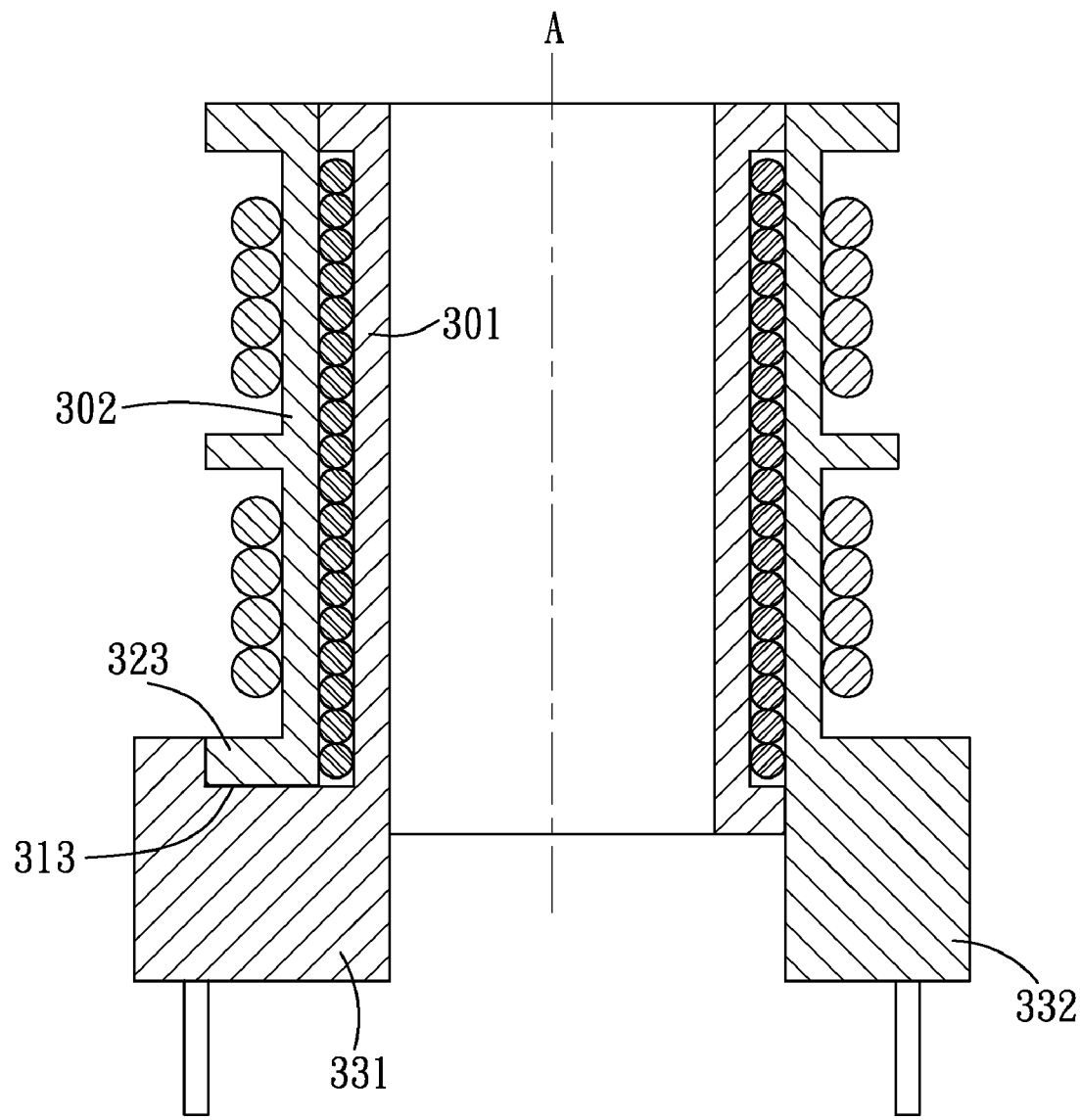
FIG. 4e is an assembled sectional diagram of the first preferred embodiment.

FIG. 4c is a circuit diagram of an asymmetric half-bridge LLC circuit including the first preferred embodiment. FIG. 4d illustrates waveforms of input and output currents in the asymmetric half-bridge LLC circuit of FIG. 4c. When a sinusoidal current ($I_i$) (such as the waveform 38 in FIG. 4d) is inputted into the transformer 3, compared to the waveform 101 in FIG. 2d, since the leakage inductance ($L_1$) of the first primary winding unit 31 (see FIG. 4a) does not vary with changes in the input current ($I_i$), the waveform 38 of the resonant current ($I_r$) closely resembles a pure sinusoidal wave. In addition, peak values of the output current ($I_o$) are uniform, and the waveform of the output current ($I_o$) is continuous (see the waveform 391 in FIG. 4d). As such, power loss of the circuit including the transformer 3 is less, and efficiency is higher.

In the first preferred embodiment of this invention, apart from ensuring that the leakage inductance ($L_1$) of the first primary winding unit 31 is maintained at a certain level under different working states, the thickness of the partition plate 303 can be adjusted according to a requirement of the circuit application, such that the distance between the first and second secondary winding units 33, 34 is adjusted so as to obtain the requisite leakage inductance. The center-tapped transformer 3 therefore has a wide range of applications.

Figure 5A:
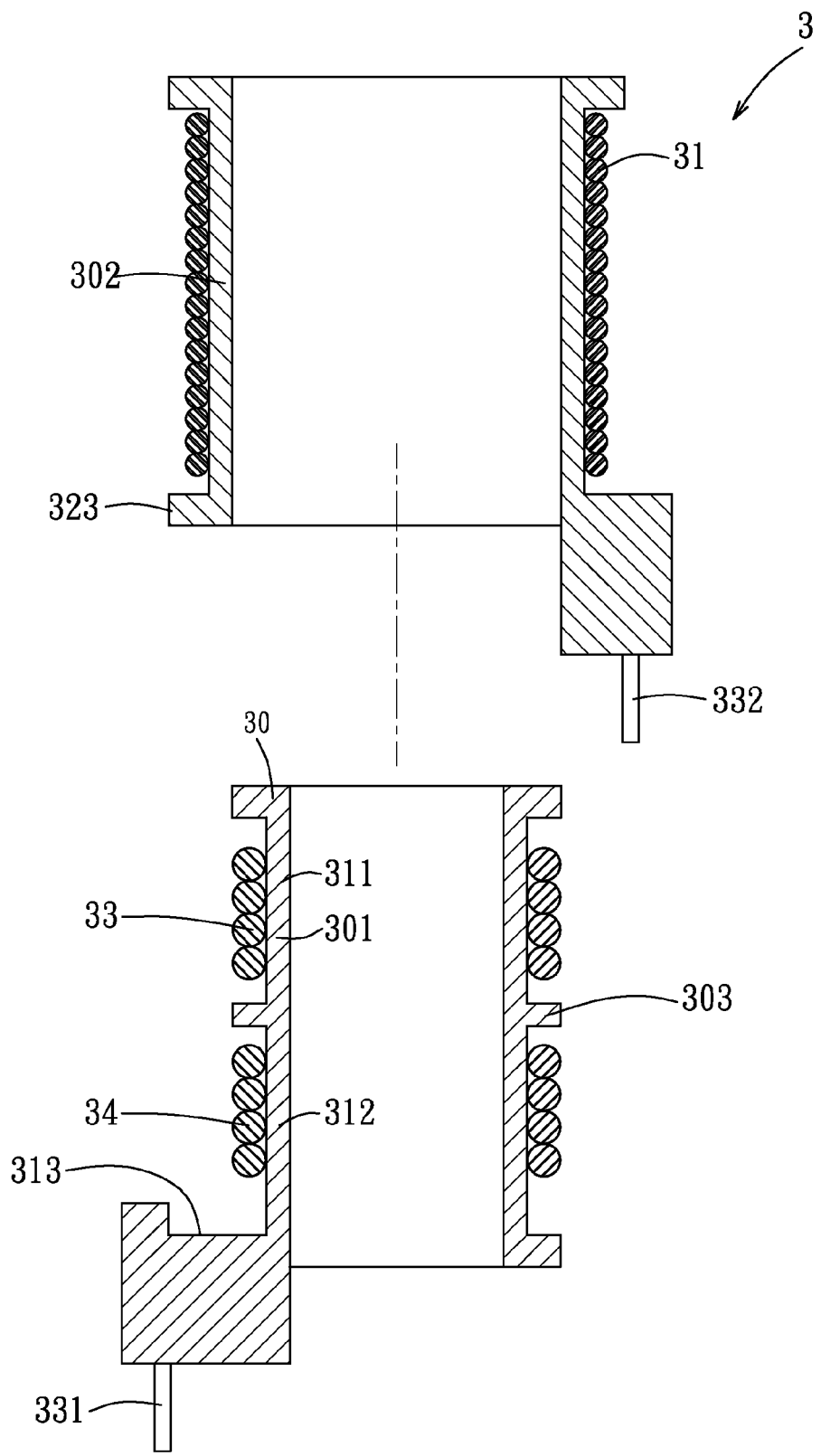
FIG. 5a is a partly exploded sectional diagram of the second preferred embodiment of a center-tapped transformer according to the present invention.
Figure 5B:
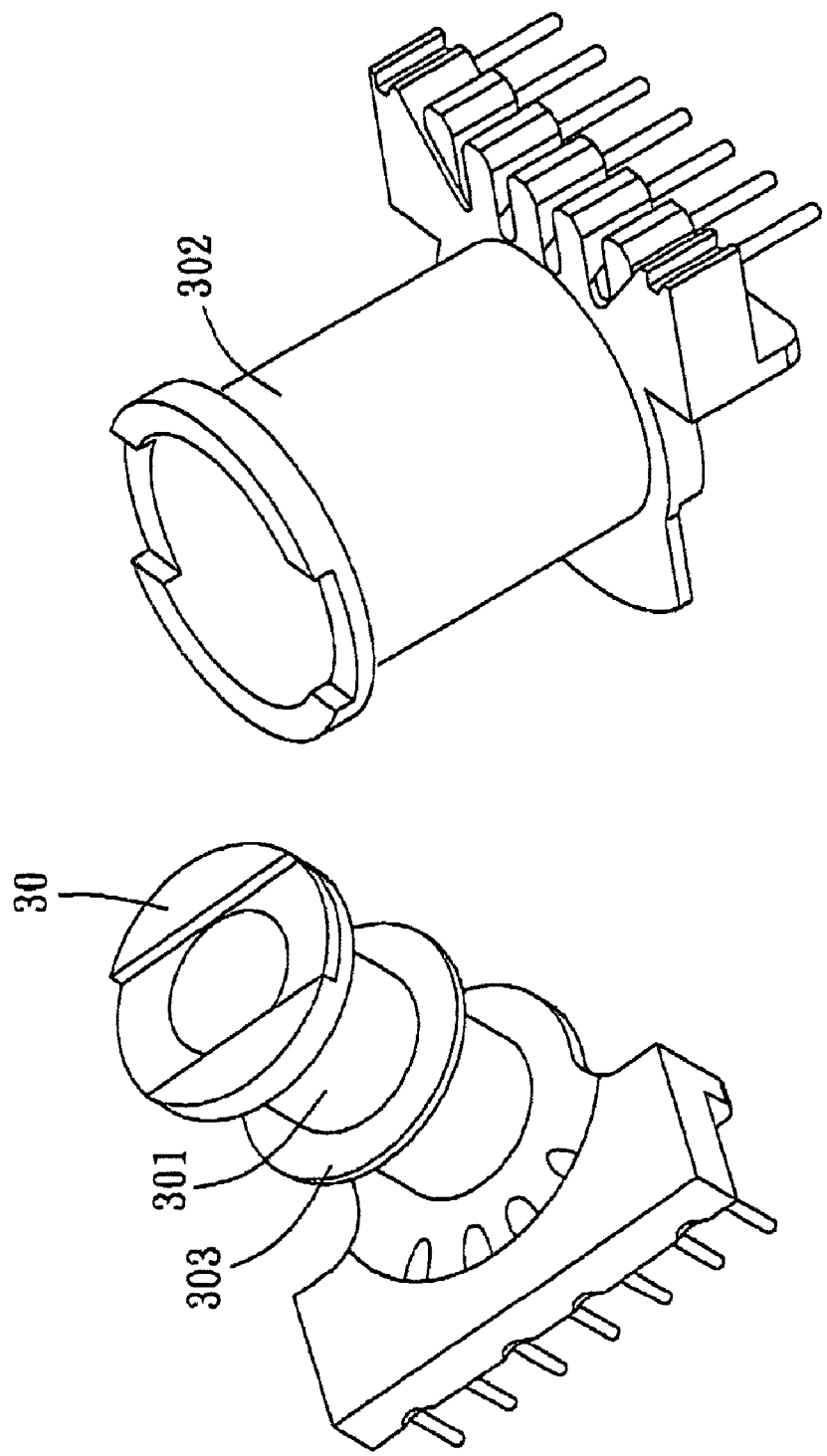
FIG. 5b is an exploded perspective view showing first and second spools of the second preferred embodiment.

Referring to FIGS. 5a and 5b, the second preferred embodiment of a center-tapped transformer 3 according to the present invention has a structure similar to that of the first embodiment. The main difference between this embodiment and the first embodiment resides in the following. In this embodiment, the first spool 30 further has a partition plate 303 that extends in radial outward directions from the first surrounding wall 301 so as to divide the first spool 30 into axially extending first and second spool parts 311, 312. The partition plate 303 is formed integrally with the first surrounding wall 301 in this embodiment. The primary winding unit 31 is wound on the second surrounding wall 302 and is connected electrically to the second pin set 332. The first and second secondary winding units 33, 34 are disposed side-by-side along the spool axis (A), are wound on the first and second spool parts 311, 312 of the first spool 30, respectively, and are connected electrically to the first pin set 331.

Like the first preferred embodiment, the leakage inductance of the first primary winding unit 31 is maintained at a certain level under different working states, and the thickness of the partition plate 303 can be adjusted according to the leakage inductance required by a circuit application.

Some of the advantages of this invention are summarized below:

1. The primary winding unit 31 is wound on one of the first and second surrounding walls 301, 302. The first and second secondary winding units 33, 34 are wound on the other one of the first and second surrounding walls 301, 302. When the first surrounding wall 301 is inserted into the second surrounding wall 302 to assemble the center-tapped transformer 3, the insulation distance between the primary winding unit 31 and the first and second secondary winding units 33, 34 has a positive effect on safety specifications.

2. Taking the embodiment of FIGS. 9a and 4b as an example, since the first and second secondary winding units 33, 34 have the same positional relationship relative to the first primary winding unit 31 and the iron core (not shown) in the first spool 30, when a sinusoidal current is inputted into the first primary winding unit 31, the leakage inductance is maintained at a certain level under different circuit working states.

3. Taking the embodiment of FIGS. 4a and 4b as an example, through adjustment of the thickness of the partition plate 303 that separates the first and second secondary winding units 33, 34 from each other, the leakage inductance of the first primary winding unit 31 is adjusted, thereby rendering the center-tapped transformer of this invention suitable for a wide range of applications.

4. The center-tapped transformer is not limited to include a horizontal spool axis or a vertical spool axis. The first spool 30 and the second spool 40 may be wound by the primary winding unit and the first and second secondary winding units, respectively and separably. Therefore, the center-tapped transformer has a wide range of applications.

5. By using the leakage inductance of the center-tapped transformer of this invention for resonance inductance of converters of LLC type, LC type, etc., additional inductors to serve as resonance inductance are not needed, thereby reducing conversion power loss and saving space.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A center-tapped transformer comprising:
    a tubular first spool having
        a first surrounding wall defining a spool axis, and having opposite first and second ends,
        a first pin-mounting wall extending radially and outwardly from a portion of said first end of said first surrounding wall, and
        a first pin set mounted on said first pin-mounting wall;
    a tubular second spool having
        a second surrounding wall having first and second ends,
        a second pin-mounting wall extending radially and outwardly from a portion of said first end of said second surrounding wall, and
        a second pin set mounted on said second pin-mounting wall;
    said second surrounding wall having an inner diameter larger than an outer diameter of said first surrounding wall, and permitting said second end of said first surrounding wall to be inserted into said second surrounding wall, said first and second pin sets being disposed at diametrically opposite sides of the spool axis when said first surrounding wall is inserted into said second surrounding wall;
    a primary winding unit wound on one of said first and second surrounding walls; and
    first and second secondary winding units wound on the other one of said first and second surrounding walls;
    wherein said first pin mounting wall is formed with a recess opposite to said first pin set along the spool axis, and said second surrounding wall is formed with a flange extending radially and outwardly from another portion of said first end of said second surrounding wall that is diametrically opposite to the second pin mounting wall, said flange engaging said recess so as to retain said first surrounding wall in said second surrounding wall when said first surrounding wall is inserted into said second surrounding wall.

2. The center-tapped transformer as claimed in claim 1, wherein said second spool further has a partition plate that extends in radial outward directions from said second surrounding wall so as to divide said second spool into axially extending first and second spool parts, said first secondary winding unit being wound on said first spool part, said second secondary winding unit being wound on said second spool part, said primary winding unit being wound on said first surrounding wall.

3. The center-tapped transformer as claimed in claim 2, wherein said partition plate is formed integrally with said second surrounding wall.

4. The center-tapped transformer as claimed in claim 3, wherein said first and second secondary winding units are disposed side-by-side along the spool axis.

5. The center-tapped transformer as claimed in claim 2, wherein said primary winding unit is connected electrically to said first pin set, and said first and second secondary winding units are connected electrically to said second pin set.

6. The center-tapped transformer as claimed in claim 1, wherein said first spool further has a partition plate that extends in radial outward directions from said first surrounding wall so as to divide said first spool into axially extending first and second spool parts, said first secondary winding unit being wound on said first spool part, said second secondary winding unit being wound on said second spool part, said primary winding unit being wound on said second surrounding wall.

7. The center-tapped transformer as claimed in claim 6, wherein said partition plate is formed integrally with said first surrounding wall.

8. The center-tapped transformer as claimed in claim 7, wherein said first and second secondary winding units are disposed side-by-side along the spool axis.

9. The center-tapped transformer as claimed in claim 6, wherein said primary winding unit is connected electrically to said second pin set, and said first and second secondary winding units are connected electrically to said first pin set.

* * * * *